United States Patent [19]

Paulyson

[11] 4,343,401
[45] Aug. 10, 1982

[54] AUTOMOBILE CONTAINERIZED SHIPMENT SUPPORT KIT

[75] Inventor: John T. Paulyson, Wyckoff, N.J.

[73] Assignee: United States Lines, Inc., Cranford, N.J.

[21] Appl. No.: 135,444

[22] Filed: Mar. 31, 1980

[51] Int. Cl.³ .......................... B60P 3/08; B61D 3/04; B65D 69/00
[52] U.S. Cl. .................................. 206/577; 105/375; 206/335; 410/26; 410/11; 410/23
[58] Field of Search ....................... 105/378, 375, 371; 206/335, 577; 410/3, 5, 7, 8, 24, 25, 26, 29, 46, 52, 66, 67, 11, 23

[56] References Cited

U.S. PATENT DOCUMENTS

| | | | |
|---|---|---|---|
| 1,263,788 | 4/1918 | Michod | 410/25 |
| 2,413,404 | 12/1946 | Black | 206/577 |
| 2,521,088 | 9/1950 | Phelps | 206/335 |
| 2,636,772 | 4/1953 | Bridge | 410/26 |
| 2,668,734 | 2/1954 | Bridge | 105/375 X |
| 2,695,568 | 11/1954 | Keith | 410/27 |
| 2,834,631 | 5/1958 | Taraldsen | 410/29 |
| 3,081,715 | 3/1963 | Moorhead et al. | 410/27 |
| 3,180,285 | 4/1965 | Gutridge | 410/27 |
| 3,405,661 | 10/1968 | Erickson et al. | 105/371 |
| 4,094,546 | 6/1978 | Glassmeyer et al. | 105/375 X |
| 4,124,119 | 11/1978 | Nordstrom | 206/335 |

OTHER PUBLICATIONS

Aeroquip Cargo Control Bulletin, No. CCB-46, Aeroquip Corporation, 1978.

Primary Examiner—Joseph F. Peters, Jr.
Assistant Examiner—Howard Beltran
Attorney, Agent, or Firm—Brooks, Haidt, Haffner & Delahunty

[57] ABSTRACT

A system and apparatus is described for loading and carrying automobiles as cargo in a standardized, enclosed, dry-freight intermodal shipping container. The apparatus is provided in the form of a kit of assemblable components for manual installation in such container and for complete removal therefrom without use of tools, by which a track deck is erected using crossbeams supported between opposed mounting tracks provided by conventional slotted sideposts along the interior sidewalls of the container, and track sections mounted, and retained by removable pins on such crossbeams. Automobiles are driven on to such track deck via a ramp extending from the loading dock to the track deck, which ramp may also be included in the kit. The cars are tied down against vertical or longitudinal movement on the tracks by nylon take-up straps extending from the cars to the sidepost mounting tracks. Automobiles are also carried below such track deck, on the container floor, additional crossbeams with specially adapted wheel chocking plates mounted thereon being also furnished as part of the kit for securing these cars against longitudinal and lateral movement on the container floor.

5 Claims, 8 Drawing Figures

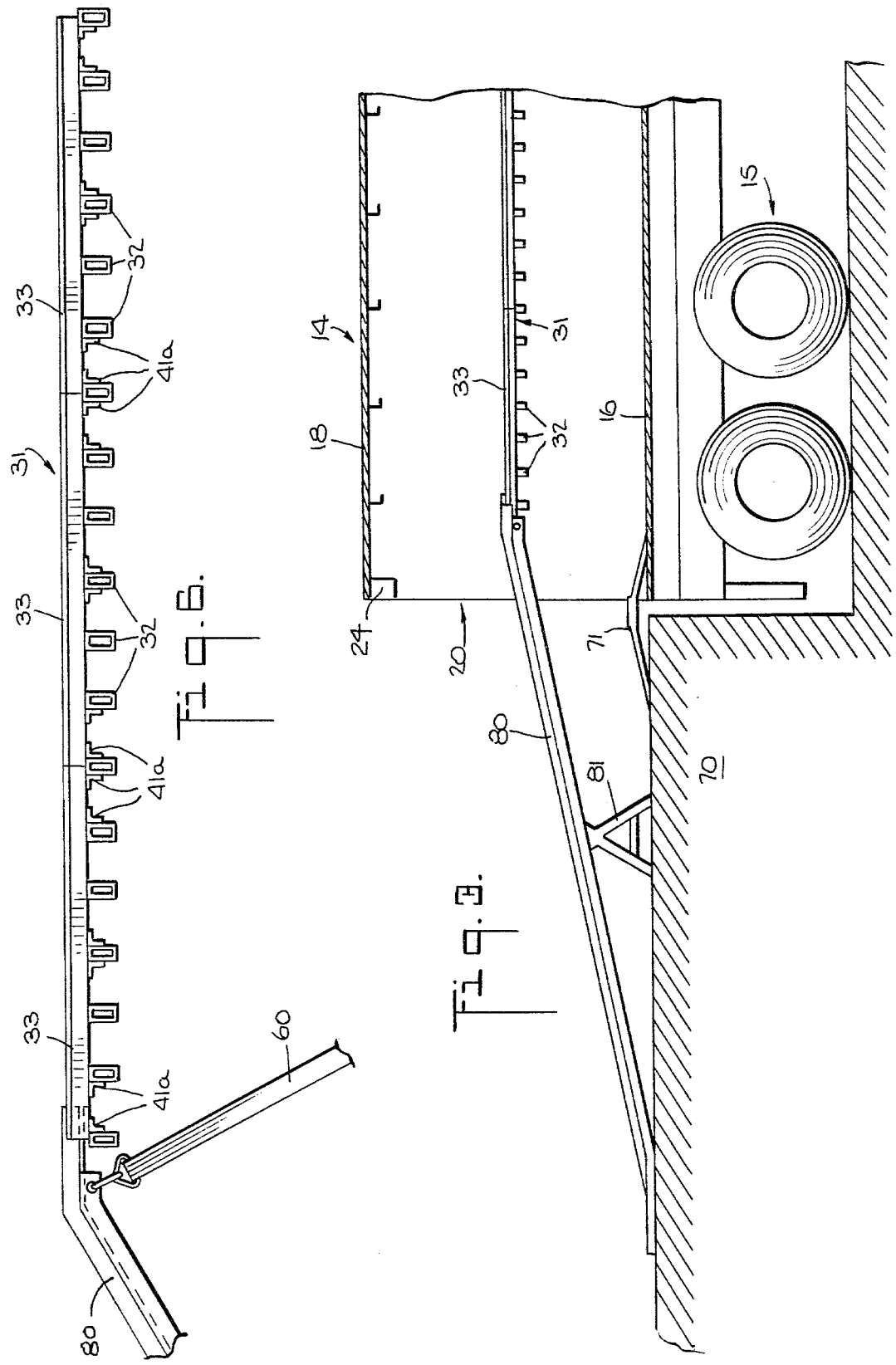

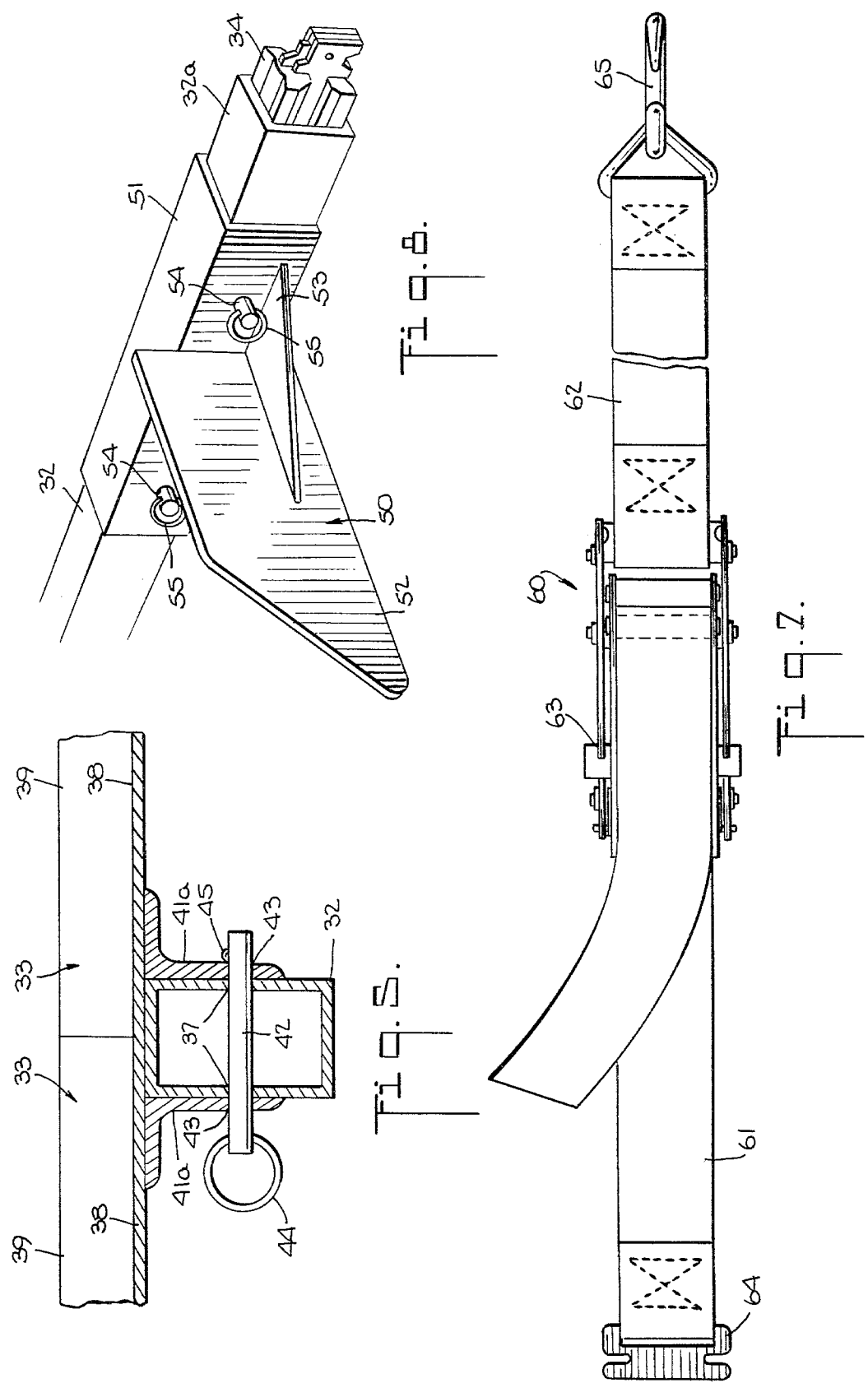

AUTOMOBILE CONTAINERIZED SHIPMENT SUPPORT KIT

FIELD OF THE INVENTION

This invention relates to the transporting of automobiles, as cargo, over long distances. More particularly, the invention relates to a system and assemblable supports components by which a plurality of automobiles may be secured within an intermodal shipping container for shipment by ship, railroad, or over-the-road hauling to their destination or destinations.

BACKGROUND OF THE INVENTION AND THE PRIOR ART

When shipping automobiles as cargo, it has been thought necessary to employ specially adapted trailers, ships, and railroad cars on which the automobiles are loaded, the trailer, ship or railroad car having hydraulically or mechanically operated jacks or ramps for placing and supporting the automobiles in their intended positions and perhaps built-in-tie-down equipment, to avoid damage to the cars in transit. See, for example, U.S. Pat. Nos. 2,668,734 (Bridge); 2,695,568 (Keith); 3,081,715 (Moorhead et al); and 3,180,285 (Gutridge).

However, standardized enclosed, dry-freight, intermodal shipping containers have become an important adjunct to modern marine, railroad, and over-the-road transportation networks, and the manifest advantages of such containers make it desirable to extend their usage to include the carrying of automobiles therein, as cargo. Such is an object of the invention. That is, an intermodal shipping container is loaded with its cargo by the shipper, who seals the container doors so that any opening of the container during shipment is detectable. The integrity of the cargo can therefore be assured, and insurance rates are reduced. Moreover, the enclosed van or container has uniform and therefore convenient size, is strong, and protects the contained cargo from accidental damage, dirt, and moisture. For these and other reasons, intermodal shipping containers are ideally suited for the shipment of automobiles overseas aboard ship, and for any subsequent shipment by rail and/or highway to their ultimate destinations.

Such containers have been used to ship one, or perhaps two tandemly placed automobiles at a time, the cars being "chocked" in place on the floor of the container by wood blocks nailed to the floor or the like. But, the weight of even two automobiles is far less than the cargo weight capacity of the container and, further, because of the relatively small volume of the automobiles as compared with that of a conventional sized container, such "containerized" shipping of automobiles using existing methods is relatively expensive. Attempts have been made to load more than two automobiles in a container by tilting the autos "tail up" as they are placed and secured therein, to utilize more of the volume and weight capacity of the container. However, such a system involves the installation of tie-down equipment on the floor or walls of the container, and at least the use, if not the installation within the van, of hydraulic jacks, pivotable tracks or other specially adapted equipment for placing and securing the automobile cargo. Needless to say, any such specialized equipment requires substantial capital expenditure. Moreover, using such "tilt-up" systems for shipping four automobiles, as much as six hours time may be required for a work crew to load the container, and as much as another six hours time may be required to off-load the automobiles therefrom depending, of course, upon the skill and training of the work crew, and the availability of hydraulic jacks and other specialized equipment.

The prior art also includes systems and apparatus, manufactured by Aeroquip Corporation of Jackson, Mich. and others, for installing a removable upper deck in a van, spaced above its floor. The installation is made by attaching removable deck beams extending transversely between opposite pairs of slotted tracks in which the deck beam ends are designed to fit, and which are permanently installed, vertical or horizontal tracks in the container. Other elevated decking systems in containers have usually been permanently installed, or involve substantial modifications to the container itself. See, for example, U.S. Pat. No. 3,405,661 (Erickson et al), and 4,094,546 (Glassmeyer et al). However, insofar as is known, such elevated decking systems have never been employed when loading automobiles in such containers.

OBJECTS OF THE INVENTION

Accordingly, it is an object of the invention to load a plurality of automobiles in a standard size enclosed van type, dry freight intermodal shipping container using lightweight, manually installed and completely removable automobile support and tie-down components so that, after unloading, the container may be returned for use in carrying general cargo. Loading and unloading times must be considerably reduced as compared with known methods. In addition, neither the automobile support and tie-down components nor their installation within the van should incorporate or require any hydraulic or mechanically operable components.

Being lightweight, manually installable, and completely removable from the container, all of the support and tie-down components will be packaged and furnished for use as a reusable kit of assemblable and installable parts, and such is a further object of the invention.

BRIEF DESCRIPTION OF THE INVENTION

Briefly and generally describing the invention in its preferred embodiment, four automobiles are conveniently loaded for shipment in a standard 40-foot long, 8-foot wide, and 9'-6" high intermodal shipping container having slotted vertically extending logistic tracks conventionally installed therein along each sidewall in spaced apart, opposed relation. A second, elevated floor or deck is installed within the container having automobile wheel tracks thereon to receive the first two cars, which are driven up a removable skid ramp on to the elevated tracks. The lengths of the tracks on the track deck are less than that of the container to permit the cars to pass under the conventional transverse header located above the rear doorway of the container, as will be seen. The ramp is removed, and the other two cars are driven into the van through its rear doorway and loaded on the container floor. The tandemly arranged lowermost cars are "choked" to the floor of the van, preferably using a cross-beam and special wheel chocks provided by the invention or, alternatively, may be tied down, i.e., lashed in place. The two cars on the tracks above do not have their wheels chocked, but are simply tied down using the tie-down straps, as will be described.

Using the lightweight aluminum deck beams, comating steel track sections, special wheel chocks, and tie-down straps provided by the invention, it is found that the system can be manually installed and all four cars loaded in the container in about one hour or less, and that the cars can be off-loaded and the system completely removed from the container in a similar time.

In the preferred embodiment, conventional transverse deck beams which attach by spring keepers between the vertical logistic tracks of the container are modified only slightly, by drilling holes therethrough at particular locations to receive other elements, and used to form the referred to upper track deck in the container, and to mount the special wheel chocks used to prevent sliding of the lower two cars. The upper deck track sections are preformed from conventional galvanized iron open grip flooring and steel angle shapes, and include downwardly projecting flanges which engage and are pinned to certain ones of the deck beams when the system is installed. Tie down of the upper two cars, and of the lower cars if desired, is made using conventional nylon strap assemblies of particular length and having take-ups and fittings for connection spanning between eyebolts or the like on the underside of the cars and the vertical logistic tracking of the container.

DETAILED DESCRIPTION OF PREFERRED EMBODIMENTS

These and other objects, features and advantages of the invention will be more fully apparent from the following detailed description thereof, in which reference will be made to the accompanying drawings. In the drawings:

FIG. 3 is another diagrammatic and fragmented side elevational showing of a container at a loading dock ready to be loaded with automobiles in accordance with the invention;

FIG. 5 is an enlarged cross-sectional view of the deck beam, as seen from lines 5—5 in FIG. 4;

FIG. 6 is a diagrammatic side elevational showing of only the track deck, to illustrate certain details;

FIG. 7 is an enlarged fragmented showing of a typical tie-down strap component; and FIG. 8 is a fragmentary perspective showing of a typical wheel chock component.

Figure 1:
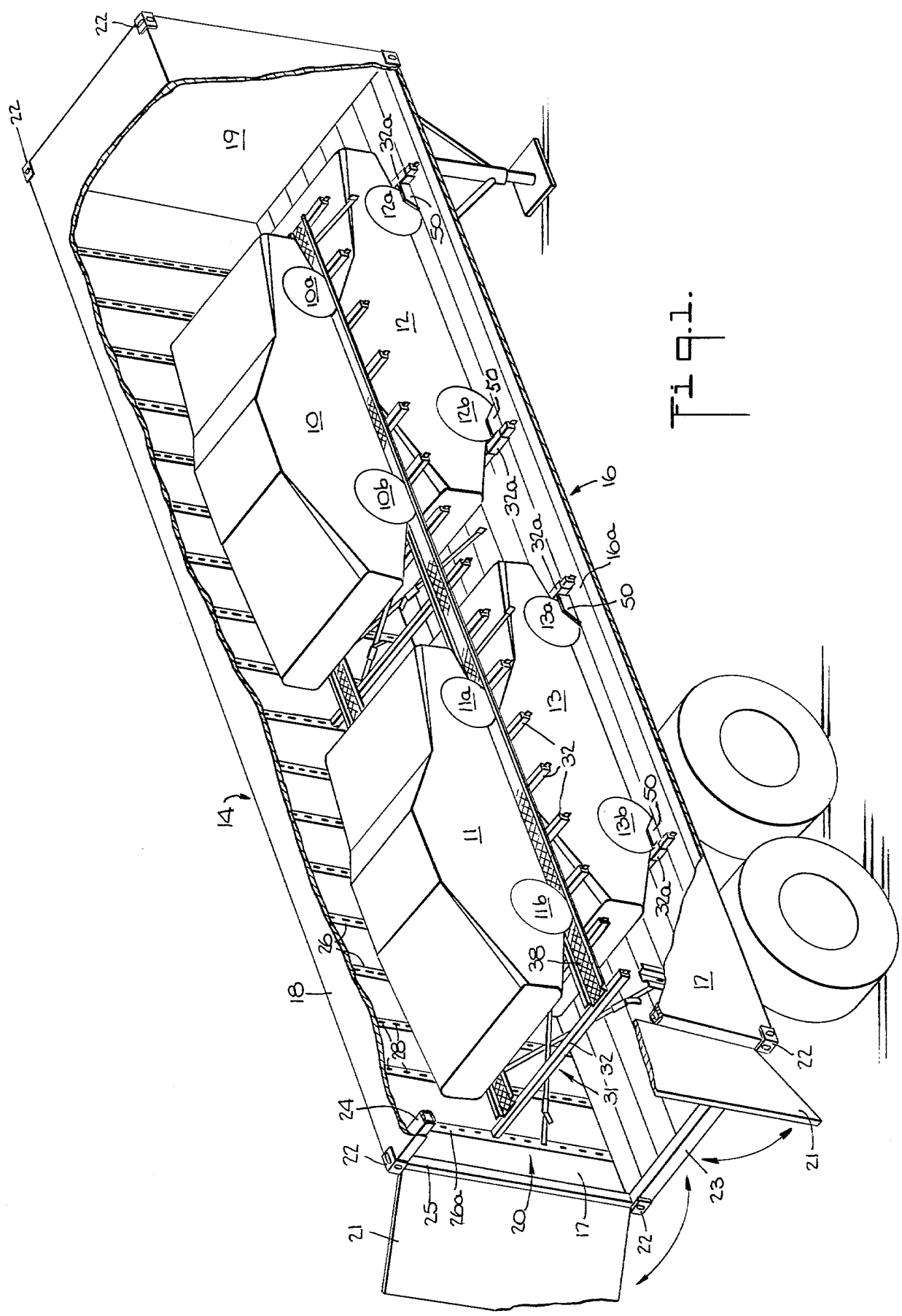
FIG. 1 is a perspective view, partially broken away, of an intermodal shipping container loaded with four automobiles, as cargo, in accordance with the invention.

Referring to FIG. 1, four small sportscar type automobiles, respectively indicated by reference numerals 10, 11, 12, and 13, are shown loaded as cargo within an intermodal shipping container, generally indicated by numeral 14, for shipment by ship or railroad, or to be mounted on a conventional container chassis which has wheels 15 (FIG. 2) for hauling by tractor over the road. Each of the two front wheels of each vehicle 10-13 is indicated by the subscript "a", while each of its rear wheels is indicated by the subscript "b", i.e., the front wheels are each indicated by numerals 10a, 11a, 12a and 13a, and the rear wheels by numerals 10b, 11b, 12b and 13b. Although other types of automobiles or vehicles might be similarly loaded in the container 14 and transported as cargo, the illustrated automobiles are Lotus Elite, Lotus Eclat or Lotus Esprit vehicles manufactured by Lotus Cars Limited of Norfolk, England, whose relevant dimensions are substantially as follows:

Height: 47.25 inches
Width: 71.5 inches
Length: 175.5–179.7 inches
Wheelbase: 97.75 inches
Front Track: 58.5 inches
Rear Track: 59.0 inches
Ground Clearance: 5.4–5.5 inches
Weight: 2271–2424 pounds Moreover, these cars when made are provided with at least four downwardly projecting eyebolts 30 (FIG. 2) which are attached to the undersides of their frames for use in moving the cars during the manufacturing process, and which are conveniently used when practicing the present invention, as will be described. Two of the eyebolts are attached in spaced apart relation on a crossrail of the frame adjacent to the front wheels, and the other pair of eyebolts is similarly attached to a frame crossrail near the rear wheels of the car.

The container 14 in which the cars are carried is a conventional enclosed, dry-cargo, intermodal shipping container of standard dimensions 40 feet long×8 feet wide×9'-6" high. It has a floor 16, sidewalls 17, a top 18, a front wall 19, and a rear doorway, generally indicated by numeral 20, through which the cars are loaded and which is closed by a pair of vertically hinged doors 21. The container 14 has standard corner castings 22 at each of its eight corners by which it is handled when loading it aboard ship, or by which it may be interlocked with other containers.

Referring to the rear doorway 20 as seen in FIGS. 1 and 3, it is formed by a rectangular steel frame which includes a transverse bottom beam 23, a transverse top header 24, and a pair of vertical doorposts 25. This rear doorway frame is joined by longitudinal beams (not shown) to a similar frame (not shown) at the front wall 19 of the container. The container usually has wood flooring 16a on its floor 16.

Figure 4:
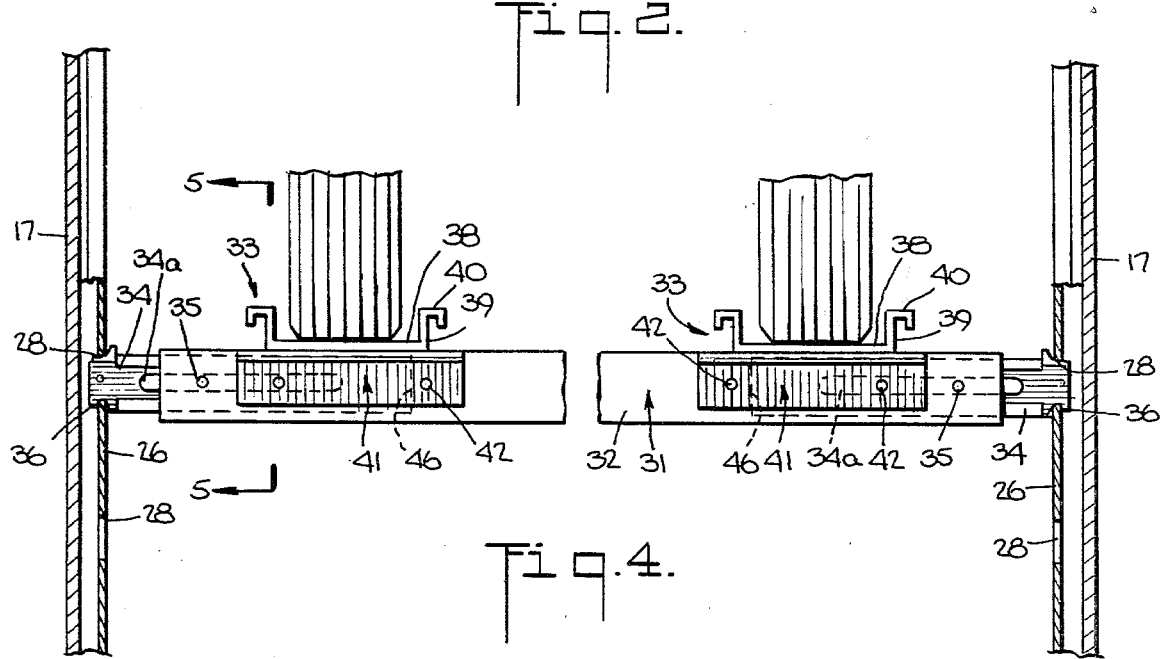
FIG. 4 is a fragmentary and partly diagrammatic cross-sectional showing, as seen from an end of the container, of a typical track deck installed therein and having an automobile supported thereon, in accordance with the invention.

In addition, and as seen in FIGS. 1 and 4, each of the sidewalls 17 is reinforced by a plurality of vertical sideposts 26 which, in the embodiment being described, total nineteen in number, being spaced 2'-0" apart along the 40'-0" length of the container. Thus, the sideposts on each side of the container are in respectively opposed relation to those on the other side. These steel sideposts are "hat-section" in shape and, at the time of building the container, their inwardly facing webs are punched with a series of aligned vertical slots 28 to form what is known as a "logistic" track therealong. In the preferred embodiment, these slots are each 2.41" high and 0.56" wide, for example, conforming to the slots in Aeroquip Corporation Series "A" style track, spaced 8" apart in the vertical direction. Alternatively, such track as manufactured by Aeroquip Corporation or others might be installed after the container is built. As seen in FIG. 1, the rearwardmost of these sidepost tracks, indicated by numeral 26a, is spaced about 2'-0" forwardly of the doorway 20. The container 14 as thus far described is a standard intermodal shipping container which is used for carrying general dry cargo.

In accordance with the invention, a kit of assemblable component parts is provided for forming and installing an elevated track deck within the container; for tying down the two cars 10 and 11 which will be supported thereon; and for "chocking" the front and rear wheels 12a, 12b, 13a, 13b of the two autos 12 and 13 which will be positioned on the floor 16 of the container.

The elevated track deck is generally indicated by references numeral 31, and is formed by a plurality of crossbeams 32 when respectively connected between the opposed logistic sidepost tracks 26, and prefabricated auto track sections 33 which are placed on the crossbeams and merely pinned thereto, as will be described. Although for particular circumstances a fewer or greater number of crossbeams, or different length track sections, might be preferable, in the embodiment being described and as illustrated in FIG. 6, nineteen crossbeams 32, and six track sections 33 each 12'-0" long, are provided in the kit, so that the track deck 31 will be 36' long within the container 14, the opposite ends of the track commencing 2' from each end of the container.

Referring particularly to FIG. 4, each beam 32 is a standard aluminum shoring beam for use in intermodal shipping containers having such logistic sideposts 26, but modified as will be described. Each is of hollow rectangular cross-section, 2-9/16" wide×3¼" high, such as Aeroquip Corporation number FE7950-2, and is adjustable in length to accommodate "bowed in" or "bowed out" container walls. Such adjustability is provided by a telescoping portion 34 at each end of the beam, which portion 34 includes a slot 34a for receiving a retainer pin 35 which limits its telescopic slidable movement to about 9". The outer or projecting end of each telescoping portion 34 has a spring biased keeper 36 formed or attached thereon, which will be accommodated and manually interlocked in any of the sidepost mounting slots 28 when the beam is to be connected thereto. The beam 32 as thus far described, including its telescoping portions 34 and its keepers 36, is presently a readily available component, and therefore its construction will not be described in further detail. However, each such crossbeam 32 is modified by drilling holes 37 (FIG. 5) therein, by which the track sections 33 may be pinned thereto, as will be described.

Referring to FIGS. 1 and 4, each auto track section 33 is fabricated from 11 gauge steel perforated floorplate, the perforations being in the upward direction to provide a non-skid tread on the track. The track 33 is substantially U-shaped in cross section as seen in FIG. 4, having a web portion 38 which forms the tread of the track, parallel upwardly projecting leg portions 39 forming the respective opposite sides of the track, and flange portions 40 which project outwardly from the side or leg portions 39 of the U-shaped section.

To the underside of each track section 33 are welded a number of downwardly projecting angle-iron connector plates 41 by which the track section will be positioned on, and pinned to certain of the crossbeams 32. As indicated in FIGS. 5 and 6, one such transversely extending connector plate 41a is located adjacent to each end of each 12' length of track 33, its downward leg being spaced inwardly therefrom a distance slightly more (e.g., 1/16" to ¼") than one-half of the width of one of the crossbeams 32, and its horizontal leg facing inwardly towards the center of the track 33. Thus, the track section may be placed on top of the installed beams 32, and be automatically positioned in longitudinal direction by abutment of the connectors 41a against oppositely facing sides of the two endmost beams 32 which are beneath the track section. Such also assures proper abutting relation of the cofacing ends of any two conjoining track sections 33, as seen in FIG. 5.

The track sections 33 are pinned to the crossbeams 32 which the connector plates abut, by quick-release type connector pins 42. As shown in FIG. 4, two connector pins 42 are passed through each connector plate 41 to prevent vertical or lateral displacement of the track 33 as, for example, when the container is bounced or moved in transit as may occur aboard ship in heavy seas. Referring to FIG. 5, it will be understood that each pin 42 is passed through a hole 43 drilled through the connector plate and through holes 37 on opposite sides of the crossbeam 32. The pin has a finger-pull ring 44 on one end, and a depressible, spring-biased projecting ball 45 adjacent to its other end, by which the pin is retained as shown in FIG. 5, yet may be easily withdrawn and disengaged by a sharp pull of the hand.

Referring to FIG. 4 it will also be understood that, by locating one of the crossbeam pin apertures 37 adjacent to the inner end location, indicated by numeral 46, of the beam telescoping portion 34, possible lateral movement of the main portion of the beam 32 on the portions 34, as might also occur during transit, can be limited.

Referring again to FIG. 6, it will be seen that, if necessary or desirable, additional connector plates 41 may be attached to the underside of each track section 33, by which the track may be pinned by quick-release pins 42 to additional beams 32 located along its length for greater assurance against vertical or lateral movement of the track. In the preferred embodiment being described, four such additional connector plates 41 are provided, two of them being pinned to the centermost beam 32 with respect to the length of the track section 33, and the other two being respectively located adjacent to a beam 32 which is spaced two feet inwardly from an end of the track section.

Figure 2:
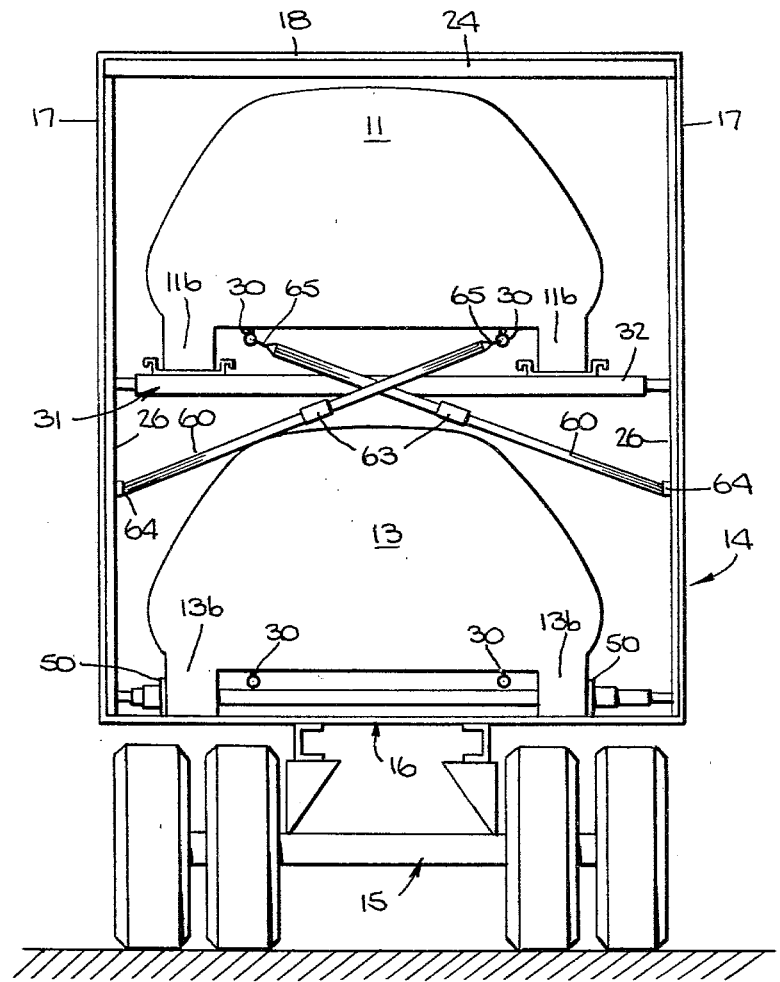
FIG. 2 is a diagrammatic end elevation showing of the container to further illustrate its loaded condition, and when mounted on a wheel boggie ready for hauling.

Referring now to FIGS. 1 and 8, the kit of component parts may include four additional crossbeams 32a for use in "chocking" the two lower cars 12 and 13 against sliding on the floor 16 of the container 14. The crossbeams 32a are respectively connected between opposed logistic sidepost tracks 26 near the floor 16 immediately in front of the front wheels and immediately behind the rear wheels of each car to prevent fore and aft movement of the vehicles, and each mounts a pair of prefabricated steel chocking blocks 50 (FIG. 8) thereon which are respectively positioned immediately adjacent to the wheels of the car, as indicated in FIGS. 1 and 2, to prevent lateral movement of the vehicles. Referring to FIG. 8, each chocking block 50 includes a U-shaped mounting bracket 51 which is sized for slidable movement along the crossbeam 32a on which it is placed. A chock plate 52 projects laterally from the mounting bracket 51, to face in the longitudinal direction of the container 14 when installed, and is welded to the mounting bracket, with a bracing gusset 53 being disposed on the outboard side of the plate 52. Thus, because of the disposition of the bracing gusset 53, each crossbeam 32a will mount a left hand and a right hand chocking block constituting the pair. Only a left hand chocking block is illustrated in FIG. 8.

The crossbeams 32a are preferably identical to the crossbeams 32 to avoid confusion during installation.

That is, the crossbeams 32a preferably have holes 37 therein at the identical locations as on crossbeams 32. Thus, the mounting bracket 51 has length equal to that of the angle iron mounting plates 41 (FIG. 4), and a pair of holes 54 therethrough whose locations correspond with those of the holes 43 through the mounting plates 41, so that the plates 41 and brackets 51 may be interchangeably mounted on any of the crossbeams 32 or 32a.

The mounting brackets 51 are pinned to the crossbeams 32a using quick-release pins 55 (FIG. 8) which are preferably identical to pins 42 (FIG. 5) for interchangeability. It will also be noted that the length of the wheelbase of each car is such that the respective crossbeams 32a at either end of the car lie closely adjacent to the tires.

Also included in the kit of component parts are eight, take-up type buckle straps 60, one of which is shown in detail in FIG. 7. Each strap 60 is actually formed by two strap portions 61, 62, and take-up buckle 63 connecting the two. The fixed length portion 61 is attached to the buckle 63 at one end thereof, and carries a keeper fitting 64 on its free end for connection to one of the logistic track slots 28 (FIG. 1) during use. The other, adjustable length portion 62 carries an attached hook 65 on its free end, and its other end engages a ratchet or the like within the buckle 63 so that it may be used to take up the length of the strap 60.

Referring to FIGS. 1 and 2, the straps 60 are used to tie down the automobiles 10 and 11 which are carried on the tracks 33. When connecting each strap 60, the hook 65 on the one end of the strap engages one of the eyebolts 30 on the underside of the frame, and the keeper 64 is connected to one of the slots 28 of a sidepost 26 on the side of the container which is opposite to the side of the car to which the eyebolt is nearest. All four eyebolts 30 are thus strapped to a logistic slot 28 and, upon tightening of all the straps using ratchet-like motion and locking of the buckles 63, the respective pairs of straps 60 at the front end and at the rear end of each automobile 10, 11 will be criss-crossed and under tension, as illustrated in FIG. 2. The strap portions 61 and 62 are made of woven nylon material, and the load-carrying capacity of each strap 60, when tightened, is about 5000 pounds. Because the slots 28 to which the straps 60 are connected are below the tracks 33, each car 10 and 11 is pressed by the strap tension downwardly against the tracks 33. Moreover, the straps 60 which tie down either car are preferably connected to pairs of logistic tracks 26 on each side of the container which are spaced farther apart than the wheelbase distance, and each of which is located inwardly towards the middle of the length of the car, so that the car is also held against any forward or rearward movement on the tracks 33.

It will be apparent from the foregoing description that a similar strap tie-down arrangement might be used to secure the lower cars 12 and 13 in place on the floor 16, in lieu of the chocking blocks 50. That is, a strap 60 may be similarly secured and tightened extending between each of the four underside eyebolts 30 on each car and correspondingly oppositely located slots 28 of respective ones of the logistic sideposts 26, thus to hold both cars against any forward, rearward, or lateral movement on the container floor 16 during transit. If such is done, the crossbeams 32a and their chocking blocks 50 are not needed.

Referring now to FIGS. 1 and 3, the manner of loading the container 14 with automobiles 10-13 will now be described. Although other possible sequences of steps will be apparent, the container 14 is backed into place, with its doors 21 opened, adjacent to a loading dock 70, and a conventional loading plate 71 is positioned spanning any gap between the rear doorway 20 and the dock 70. The plate 71 extends across a major portion of the width of the container 14. Using the previously described components, the series of nineteen crossbeams 32 are first installed in parallel, longitudinally spaced apart aligned relation at the same elevation, on and between respectively opposed pairs of the sidepost mounting tracks 26, to extend from the first mounting track 26 near the front wall 19 to the last mounting track 26 located two feet inwardly of the doorway 20. The sections of track 33 are place thereon and pinned to the appropriate crossbeams 32, using the pins 42 as previously described, as the installation of the track deck 31 proceeds from the front end 19 towards the rear doorway 20 of the container.

In addition, a wheel chock crossbeam 32a is attached between the appropriate logistic sideposts 26 near the front wall 19 of the container, for receiving and chocking the front wheels 12a of the front car 12. A pair of chocking blocks 50 is then mounted on, and pinned to the crossbeam 32a in appropriate locations to chock the front wheels of car 12. As indicated in FIG. 2, so that the drivers of cars 12 and 13 may conveniently open those car doors and emerge after the cars are loaded, the chocking blocks 50 on the frontmost crossbeam 32a are located more towards one side of the container 14 than to the other.

Referring to FIG. 3, a skid ramp 80, formed by two or more track lengths which may also be furnished as components of the kit of parts provided by the invention, is attached to the rearwardmost of the crossbeams 32, extending upwardly from the loading dock 70 as shown. The ramp 80 is supported by one or more horses 81, as may also be a component of the kit, which correctly space the tracks as they extend downwardly towards the dock 70, their upper ends being in nestled engagement with, and thus correctly spaced by the respective track sections 33. Although not illustrated in detail, the separate track sections which make up the ramp 80 are "Z"-sectioned steel track having a non-skid web section as do the tracks 33. Thus, one of the flanges of the Z-shape on each track together provide upwardly projecting vertical guides for the car wheels as the car is driven up the ramp 80. The downwardly projecting flange of each Z-shape adds strength, but together are also used at their upper ends as connection locations for a pair of the straps 60 (FIG. 7) to temporarily hold the ramp in place as the two upper cars 10 and 11 are loaded. That is, each of these lower flanges is provided with a hole to receive one of the strap hooks 65. A pair of straps 60 is attached and tightened between the respective ramp tracks and an adjacent, but lower logistic slot 28 to which the strap keeper 64 is connected, to thus press the upper ends of the ramp tracks downwardly and forwardly against the respective tracks 33.

It will be noted from FIG. 2 that the tracks 33 are also located nearer one side of the container 14 to permit the drivers of the cars to conveniently emerge. Car 10 is then driven or otherwise rolled from the dock up the ramp 80 and on to the tracks 33 to its desired location towards the forward end of the container. Its brakes are set, and the criss-crossing straps 60 are then attached to tie the car down as previously described, and as illustrated in FIGS. 1 and 2. Thereafter, car 11 is similarly driven up the ramp 80 and to its position on the tracks 33 where it is similarly secured using four straps 60.

The ramp 80 and loading plate 71 are then removed.

The car 12 is then simply driven or otherwise rolled from the loading dock 70 over the dockplate 71 and into the container 14 and against the front crossbeam 32a with its front wheels 12a between the pair of chocking blocks 50 mounted on the crossbeam. Its brakes are then set, and a second crossbeam 32a is attached between the opposed pair of logistic mounting tracks 26 which is immediately behind the rear wheels 12b of the car, and a pair of chocking blocks 50 is appropriately mounted and pinned thereto, in chocking engagement with the rear wheels 12b.

The third crossbeam 32a, carrying a pair of chocking blocks 50 appropriately mounted and pinned thereto, is then positioned and attached spanning between opposed logistic sidepost mounting tracks 26 for receiving the front wheels 13a of car 13, which is then similarly driven into the container and against the crossbeam so that its front wheels 13a engage the chocking blocks. Thereafter, the rearwardmost crossbeam 32a and its pair of chocking blocks 50 are similarly installed, thus chocking the rear wheels 13b of car 13. Of course, the brakes of car 13 are set.

The container is then pulled forward, and its doors 21 are closed, locked, and sealed for shipment.

When the container 14 arrives at its destination, its doors are opened and the container is again backed against a loading dock for offloading the automobiles 10-13 in reverse manner. With the dock ramp 71 in place, the rear wheel chocking of car 13 is removed and car 13 is driven backwards out from the container 14 and on to the dock 70. After removing the front wheel chocking which had been set for the car 13 and the rear wheel chocking of car 12, car 12 is similarly driven out from the container 14.

The ramp 80 is again attached extending between the tracks 33 of the container track deck 31 and the dock 70. The straps 60 holding down car 11 are removed, and the car is driven back down the ramp. Car 10 is similarly unlashed and driven down the ramp, whereupon the ramp 80 is removed.

The front wheel chocking for car 12 is removed, as is the track deck 31. The track deck is conveniently and completely removed from the container 14 simply by pulling all of the pins 41 by which the track sections 33 are connected to certain of the crossbeams 32 as aforesaid, then removing the track sections 33 and disconnecting and removing the crossbeams 32.

It will be noted that all of the components are manually installable and completely removable from the container after use, and no tools are required either to install or remove the components. Moreover, the system is adjustable to accommodate special circumstances of use. For example, because the tracks are formed by several track sections rather than a single, long length track, fewer than all of the track sections may be used in instances where only one automobile is to be carried on the track deck. In addition, the system permits the carrying of general cargo within the same container where one or more of the maximum number of automobiles is omitted and, by selection of a different height at which the track deck will be installed, different types and sizes of automobiles may be accommodated, including light pickup vehicles, vans or the like.

Thus, a system and apparatus have been described for loading automobiles or the like in a standardized intermodal shipping container for shipment as cargo, and for offloading them as they arrive at their destinations, which achieves all of the objects of the invention.

What is claimed is:

1. A kit of assemblable component parts for loading and transporting automobiles as cargo within an enclosed, dry-cargo intermodal shipping container having a floor, respective sidewalls having opposed and spaced apart mounting tracks thereon and along substantially their respective lengths, a front wall, a top, and a rear doorway, said kit comprising apparatus for installing an elevated automobile track deck within said container comprising a plurality of manually installable and removable crossbeams respectively adapted for mounting on, and spanning between, opposed ones of said sidewall mounting tracks within said container, a plurality of automobile track sections adapted for mounting on said plurality of crossbeams when so installed to provide a pair of parallel, spaced apart wheel tracks extending longitudinally within said container for receiving an automobile moved thereon, at least some of said crossbeams and said automobile track sections being adapted by means thereon for connecting said track sections to said adapted crossbeams to substantially prevent vertical, longitudinal, and lateral movement of said track sections when so mounted on said installed crossbeams thereby to form said automobile track deck within said container, and a plurality of adjustable take-up strap means each adapted for connection to an automobile and for extending and connection to respective ones of said sidewall mounting tracks to substantially prevent movement of said automobile when the latter is on said automobile track deck.

2. A kit according to claim 1 further comprises a plurality of connector pins, and wherein each of said track sections has at least one downwardly projecting and transversely extending connector plate adapted for engaging one of said adapted crossbeams when the track section is so mounted on said installed crossbeams, each said connector plate having aperture means therein for receiving one of said connector pins therethrough, and each of said adapted crossbeams has aperture means therein, each said crossbeam aperture means being located on the crossbeam to be in alignment with one of said track section connector plate aperture means when said track sections are so mounted on said crossbeams and being adapted for receiving said connector pin therethrough.

3. A kit according to claim 1 which further comprises loading ramp track means having one end including means adapted for connection to that end of said automobile track deck which is adjacent to said container rear doorway when said track deck is so installed, and another end adapted for placement on a loading dock, thereby to form extensions of said wheel tracks for driving an automobile thereon and on to said wheel tracks of said track deck.

4. A kit according to claim 1 which further comprises a second plurality of manually installable and removable crossbeams respectively adapted for mounting on, and spanning between, opposed ones of said sidewall mounting tracks adjacent to said floor within said container, said second plurality consisting of a pair of said crossbeams for each said automobile to be carried on said floor of the container, and respective wheel chocking means adapted for mounting on each crossbeam in said second plurality of crossbeams for engaging a wheel of an automobile carried on said floor of the container, each of said second plurality of crossbeams and each of said wheel chocking means being adapted by means thereon for connecting said wheel chocking means on the crossbeam at a location on the latter to so engage said automobile wheel when the crossbeam is so mounted within said container.

5. A kit according to claim 4 wherein each of said second plurality of crossbeams is identical to each of said adapted crossbeams in the first said plurality of crossbeams, and said connecting means on each said wheel chocking means is similar to said connecting means on any of said track sections, whereby said second plurality of crossbeams and said adapted crossbeams in the first said plurality are interchangeable with each other.

* * * * *